United States Patent
Qu et al.

(10) Patent No.: US 11,312,888 B2
(45) Date of Patent: Apr. 26, 2022

(54) TWO-COMPONENT SOLVENTLESS ADHESIVE COMPOSITIONS AND METHODS OF MAKING SAME

(71) Applicants: Dow Global Technologies LLC, Midland, MI (US); Rohm and Haas Company, Collegeville, PA (US)

(72) Inventors: Zhaohui Qu, Shanghai (CN); Rui Shi, Shanghai (CN)

(73) Assignees: DOW GLOBAL TECHNOLOGIES LLC, Midland, MI (US); ROHM AND HAAS COMPANY, Collegeville, PA (US)

(*) Notice: Subject to any disclaimer, the term of this patent is extended or adjusted under 35 U.S.C. 154(b) by 29 days.

(21) Appl. No.: 16/089,075

(22) PCT Filed: Mar. 28, 2016

(86) PCT No.: PCT/CN2016/077477
§ 371 (c)(1),
(2) Date: Sep. 27, 2018

(87) PCT Pub. No.: WO2017/166003
PCT Pub. Date: Oct. 5, 2017

(65) Prior Publication Data
US 2019/0127616 A1    May 2, 2019

(51) Int. Cl.
| | | |
|---|---|---|
| *C09J 175/04* | (2006.01) |
| *C08G 18/76* | (2006.01) |
| *C08G 18/32* | (2006.01) |
| *C08G 18/42* | (2006.01) |
| *C08G 18/10* | (2006.01) |
| *C08G 18/40* | (2006.01) |
| *C09J 175/08* | (2006.01) |
| *C08G 18/48* | (2006.01) |
| *C08G 18/66* | (2006.01) |
| *C08G 18/62* | (2006.01) |
| *C09J 5/00* | (2006.01) |

(52) U.S. Cl.
CPC ............ *C09J 175/04* (2013.01); *C08G 18/10* (2013.01); *C08G 18/3206* (2013.01); *C08G 18/4018* (2013.01); *C08G 18/4216* (2013.01); *C08G 18/4829* (2013.01); *C08G 18/6212* (2013.01); *C08G 18/664* (2013.01); *C08G 18/6607* (2013.01); *C08G 18/7671* (2013.01); *C09J 5/00* (2013.01); *C09J 175/08* (2013.01); *C09J 2475/00* (2013.01)

(58) Field of Classification Search
CPC ..................................................... C09J 175/04
See application file for complete search history.

(56) References Cited

U.S. PATENT DOCUMENTS

| | | | |
|---|---|---|---|
| 4,704,445 A | 11/1987 | Komiya et al. | |
| 7,754,828 B2* | 7/2010 | Shah .................. | C08G 18/6696 525/454 |
| 2008/0308226 A1* | 12/2008 | Imai ...................... | C08G 18/10 156/327 |
| 2011/0218275 A1 | 9/2011 | Wu et al. | |
| 2013/0274401 A1 | 10/2013 | Allen et al. | |

FOREIGN PATENT DOCUMENTS

| | | |
|---|---|---|
| CN | 103820069 A | 5/2014 |
| EP | 0740675 | 11/1996 |
| JP | 2002275449 A | 9/2002 |
| JP | 03915371 | 5/2007 |
| JP | 05546799 | 7/2014 |

OTHER PUBLICATIONS

PCT/CN2016/077477, International Search Report and Written Opinion dated Sep. 30, 2016.
PCT/CN2016/077477, International Preliminary Report on Patentability dated Oct. 2, 2018.

* cited by examiner

*Primary Examiner* — Daniel H Lee

(57) ABSTRACT

A solventless adhesive is disclosed, the adhesive comprising an isocyanate component comprising at least one isocyanate prepolymer that is the reaction product of reactants comprising at least one isocyanate, at least one polyol, and a branched alkane diol, and a polyol component comprising at least one polyol and a branched alkane diol. The branched alkane diol can comprise a single side alkyl chain, such as 3-methyl-1,5-pentanediol, 2-methyl-1,3-propanediol, and combinations thereof. Further, a method for forming a laminate is disclosed, the method comprising forming a solventless adhesive composition comprising a branched alkane diol, applying a layer of the adhesive composition to a surface of a film, bringing the layer into contact with a surface of another film to form a laminate, and curing the adhesive composition. Still further, a laminate formed by the method is disclosed.

4 Claims, No Drawings

TWO-COMPONENT SOLVENTLESS ADHESIVE COMPOSITIONS AND METHODS OF MAKING SAME

FIELD OF THE DISCLOSURE

The instant disclosure relates to solventless adhesive compositions. More particularly, the disclosure relates to two-component solventless adhesive compositions for use with laminate films, the compositions having improved chemical resistance and coefficient of friction, and methods of making the same.

BACKGROUND OF THE DISCLOSURE

Adhesive compositions are useful for a wide variety of purposes. For instance, adhesive compositions are used to bond together substrates such as polyethylene, polypropylene, polyester, polyamide, metal, paper, or cellophane to form composite films, i.e., laminates. The use of adhesives in different laminating end-use applications is generally known. For example, adhesives can be used in the manufacture of film/film and film/foil laminates used in the packaging industry, especially for food packaging. Adhesives used in laminating application, or "laminating adhesives," can be generally placed into three categories: solvent-based, water-based, and solventless. The performance of an adhesive varies by category and by the application in which the adhesive is applied.

Solventless laminating adhesives can be applied up to 100% solids without either organic solvents or an aqueous carrier. Because no organic solvent or water has to be dried from the adhesive upon application, these adhesives can be run at high line speeds and are preferable in applications requiring quick adhesive application. Solvent and water-based laminating adhesives are limited by the rate at which the solvent or water can be effectively dried and removed upon application. For environmental, health, and safety reasons, laminating adhesives are preferably aqueous or solventless.

Within the category of solventless laminating adhesives, there are many varieties. One particular variety includes two-component polyurethane-based laminating adhesives. Typically, a two-component polyurethane-based laminating adhesive includes a first component comprising an isocyanate-containing prepolymer and a second component comprising a polyol. The first component is obtained by the reaction of excess isocyanate with a polyether and/or polyester containing two or more active hydrogen groups per molecule. The second component is a polyether and/or polyester functionalized with two or more hydroxyl groups or the like per molecule. The two components are combined in a predetermined ratio and applied on a film/foil substrate, which is then laminated to another film/foil substrate.

Two-component solventless polyurethane-based laminating adhesives, compared to traditional solvent-containing adhesives, include weak initial bonds and slow bond development before the laminate can be processed. In addition, these adhesives tend to exhibit poor chemical resistance, especially in acidic conditions. Still more, two-component solventless polyurethane-based laminating adhesives with a low coefficient of friction provide for enhanced bonding between a film substrate and a film/metal substrate.

Therefore, two-component solventless polyurethane-based laminating adhesive compositions with improved chemical resistance and coefficients of friction, and methods of making same, are desirable.

SUMMARY OF THE DISCLOSURE

A solventless adhesive composition is disclosed. The solventless adhesive composition comprises an isocyanate component comprising at least one isocyanate prepolymer that is the reaction product of reactants comprising at least one isocyanate, at least one polyol, and a branched alkane diol. The solventless adhesive composition further comprises a polyol component comprising at least one polyol and a branched alkane diol. The at least one isocyanate can be selected from the group consisting of an aromatic isocyanate, an aliphatic isocyanate, and combinations thereof. The at least one polyol can be selected from the group consisting of a polyester polyol, a polyether polyol, and combinations thereof. The branched alkane diol can comprise a single side alkyl chain, such as 3-methyl-1,5-pentanediol.

A method for forming a laminate is also disclosed. The method comprises forming a solventless adhesive composition, applying a layer of the adhesive composition to a surface of a film, bringing the layer into contact with a surface of another film to form a laminate, and curing the adhesive composition. A laminate formed by this method is also disclosed.

DETAILED DESCRIPTION OF THE DISCLOSURE

The two-component solventless adhesive composition according to this disclosure comprises an isocyanate component and a polyol component.

Isocyanate Component

The isocyanate component comprises at least one isocyanate prepolymer that is the reaction product of reactants (the "prepolymer reactants") comprising at least one isocyanate, at least one polyol, and a branched alkane diol.

The at least one isocyanate can be selected from the group consisting of an aromatic isocyanate, an aliphatic isocyanate, and combinations thereof Examples of aromatic isocyanates suitable for use according to this disclosure include, but are not limited to, isomers of methylene diphenyl diisocyanate ("MDI") such as 4,4-MDI, 2,2-MDI and 2,4-MDI, isomers of toluene-diisocyanate ("TDI") such as 2,4-TDI, 2,6-TDI, isomers of naphthalene-diisocyanate ("NDI") such as 1,5-NDI, and combinations thereof Preferred are isomers of MDI, particularly mixture of 4,4-MDI and 2,4-MDI (liquid MDI) or 4,4-MDI (solid MDI). Examples of aliphatic isocyanates suitable for use according to this disclosure include, but are not limited to, isomers of hexamethylene diisocyanate ("HDI"), isomers of isophorone diisocyanate ("IPDI"), isomers of xylene diisocyanate ("XDI"), and combinations thereof.

The amount of the at least one isocyanate in the isocyanate component is, by weight based on the weight of the isocyanate component, at least 20 wt. %, more preferably at least 30 wt. %, still more preferably at least 40 wt. %. The amount of the at least one isocyanate in the isocyanate component is not to exceed, by weight based on the weight of the isocyanate component, 90 wt. %, more preferably 80 wt. %, still more preferably 70 wt. %.

The at least one polyol can be selected from the group consisting of a polyester polyol, a polyether polyol, and combinations thereof A compound that contains two or more ether linkages in the same linear chain of atoms is known herein as a polyether. A compound that contains two or more ester linkages in the same linear chain of atoms is known herein as a polyester. A compound that is a polyester and a polyol is a polyester polyol, and a compound that is a polyether and a polyol is a polyether polyol. Preferably each at least one polyol has viscosity at 25° C. of 10 mPa·s to 7,000 mPa·s, as measured by the method of ASTM D2196.

The amount of the at least one polyol in the isocyanate component is, by weight based on the weight of the isocyanate component, at least 10 wt. %, more preferably at least 15 wt. %, still more preferably at least 20 wt. %. The amount of the at least one polyol in the isocyanate component is not to exceed, by weight based on the weight of the isocyanate component, 80 wt. %, more preferably 70 wt. %, still more preferably 60 wt. %.

The branched alkane diol can comprise a branched alkane diol comprising a main alkyl chain having 3 to 10 carbon atoms and a single branched alkyl chain having1 to 6 carbon atoms. Preferred branched alkane diols suitable for use according to this disclosure include 3-methyl-1,5-pentanediol, 2-methyl-1,3-propanediol.

The amount of the at least one branched alkane diol in the isocyanate component is, by weight based on the weight of the isocyanate component, at least 0.01 wt. %, more preferably at least 0.1 wt. %, still more preferably at least 1 wt. %. The amount of the at least one branched alkane diol in the isocyanate component is not to exceed, by weight based on the weight of the isocyanate component, 15 wt. %, more preferably 10 wt. %, still more preferably 5 wt. %.

Compounds having isocyanate groups, such as the at least one isocyanate prepolymer of the isocyanate component, may be characterized by the parameter "% NCO," which is the amount of isocyanate groups by weight based on the weight of the compound. The parameter % NCO is measured by the method of ASTM D 2572-97(2010). The disclosed isocyanate component has a % NCO of at least 5 wt. %, more preferably at least 8 wt. %, still more preferably at least 10 wt. %. Preferably the isocyanate component has a % NCO not to exceed 30 wt. %, more preferably 25 wt. %, still more preferably 22 wt. %, even more preferably 19 wt. %.

Preferably the isocyanate component has viscosity at 25° C. of 300 mPa·s to 12,000 mPa·s, as measured by the method of ASTM D2196.

The isocyanate component can, optionally, comprise one or more catalysts. Examples of the at least one catalyst suitable for use according to this disclosure include, but are not limited to, dibutyltin dilaurate, zinc acetate, 2,2-dimorpholinodiethylether, and combinations thereof.

Polyol Component

The solventless adhesive composition further comprises a polyol component comprising at least one polyol and a branched alkane diol.

The at least one polyol can be selected from the group consisting of a polyester polyol, a polyether polyol, and combinations thereof The at least one polyol can be selected from the group consisting of a polyester polyol, a polyether polyol, and combinations thereof Preferably each at least one polyol has viscosity at 25° C. of 10 mPa·s to 7,000 mPa·s, as measured by the method of ASTM D2196.

The amount of the at least one polyol in the polyol component is, by weight based on the weight of the polyol component, at least 50 wt. %, more preferably at least 60 wt. %, still more preferably at least 70 wt. %. The amount of the at least one polyol in the polyol component is not to exceed, by weight based on the weight of the polyol component, 100 wt. %, more preferably 90 wt. %, still more preferably 80 wt. %.

The branched alkane diol can comprise a branched alkane diol comprising a main alkyl chain having 3 to 10 carbon atoms and a single branched alkyl chain having1 to 6 carbon atoms. Preferred branched alkane diols suitable for use according to this disclosure include 3-methyl-1,5-pentanediol, 2-methyl-1,3-propanediol.

The amount of the at least one branched alkane diol in the polyol component is, by weight based on the weight of the polyol component, at least 1 wt. %, more preferably at least 3 wt. %, still more preferably at least 5 wt. %. The amount of at the least one branched alkane diol in the polyol component is not to exceed, by weight based on the weight of the polyol component, 35 wt. %, more preferably 30 wt. %, still more preferably 25 wt. %.

Preferably the polyol component has viscosity of 100 to 10,000 mPa·s at 25° C., as measured using ASTM D2196.

Preferably, the weight ratio of the isocyanate component to the polyol component is 100:100 to 100:30.

It is contemplated that the isocyanate component and the polyol component of the disclosed solventless adhesive composition can be made separately and, if desired, stored until it is desired to use the adhesive composition. Preferably, both the isocyanate component and the polyol component are each liquid at 25° C. When it is desired to use the adhesive composition, the isocyanate component and the polyol component are brought into contact with each other and mixed together. It is contemplated that when these two components are brought into contact, a curing reaction begins in which the isocyanate groups react with the hydroxyl groups to form urethane links. The adhesive composition formed by bringing the two components into contact can be referred to as a "curable mixture."

A method of forming a laminate using an adhesive composition is also disclosed. Preferably, the adhesive composition, such as the adhesive composition discussed above, is in a liquid state. Preferably the composition is a liquid at 25° C. Even if the composition is solid at 25° C., it is acceptable to heat the composition as necessary to put it in a liquid state. A layer of the composition is applied to a surface of a film. A "film" is any structure that is 0.5 mm or less in one dimension and is 1 cm or more in both of the other two dimensions. A polymer film is a film that is made of a polymer or mixture of polymers. The composition of a polymer film is, typically, 80 percent by weight or more by weight one or more polymers. Preferably, the thickness of the layer of the curable mixture is 1 to 5 μm.

Preferably, a surface of another film is brought into contact with the layer of the curable mixture to form an uncured laminate. Preferably, the uncured laminate is made at a time when the amount of unreacted isocyanate groups present in the adhesive composition is, on a molar basis compared to the amount of isocyanate groups present in the isocyanate component prior to contact with the polyol component, at least 50%, more preferably at least 75%, still more preferably at least 90%.

The curable mixture is then cured or allowed to cure. The uncured laminate may be subjected to pressure, for example by passing through nip rollers, which may or may not be heated. The uncured laminate may be heated to speed the cure reaction.

Suitable films include paper, woven and nonwoven fabric, metal foil, polymers, and metal-coated polymers. Films optionally have a surface on which an image is printed with ink; the ink may be in contact with the adhesive composition. Preferred films are polymer films and metal-coated polymer films, more preferred are polymer films.

Examples of the Disclosure

The present disclosure will now be explained in further detail by showing Illustrative Examples and Comparative Examples. However, the scope of the present disclosure is not, of course, limited to these examples.

Composition Preparation

The raw materials for use in the Illustrative Examples ("IE") and Comparative Examples ("CE") are detailed in Table 1 below.

TABLE 1

Raw Materials

| Raw Material | Description | Supplier |
|---|---|---|
| Polyester resin (Bester 648) ("PE") | Polyester polyol, MW = 800 | The Dow Chemical Company |
| Polypropylene glycol P 2,000 ("PPG") | Polyether polyol, MW = 2000 | The Dow Chemical Company |
| Methylene diphenyl diisocyanate (Desmodur 2460) ("MDI") | Liquid MDI | Bayer AG |
| 3-methyl-1,5-pentanediol ("MPD") | Diol | Kuraray Co., Ltd |
| 2-methyl-1,3-propanediol (MPDiol) | Diol | Sinopharm Chemical Reagent Co., Ltd. |
| Neopentyl glycol ("NPG") | Diol | Sinopharm Chemical Reagent Co., Ltd. |
| Dipropylene glycol ("DPG") | Diol | Sinopharm Chemical Reagent Co., Ltd. |
| Diethylene glycol ("DEG") | Diol | Sinopharm Chemical Reagent Co., Ltd. |

The isocyanate component and polyol component of the Examples are synthesized according to formulation listed in Table 2. In particular, the isocyanate component is synthesized in a 1000 ml glass reactor according to a typical polyurethane pre-polymer preparation process. 170 g of Desmodur 2460 is introduced into the reactor and maintained at 60° C. with nitrogen protection. Next, 82 g of Bester 648 and 5 g of a diol, as indicated in Table 2, is introduced into the reactor to mix with the Desmodur 2460. The temperature is slowly increased to 80° C. and maintained for 2 to 3 hours. Finally, the produced prepolymer is charged into a sealed container with nitrogen protection for further application.

The polyol component includes a mixture of 45 g of Bester 648, 40 g of PPG, and 15 g of a diol, as indicated in Table 2. Before introducing the raw materials into the reactor, the moisture content of the raw materials should be less than 500 ppm. While stirring and mixing the raw materials in the polyol component, nitrogen is supplied to avoid moisture contamination of the mixture.

TABLE 2

Two-Component Solventless Adhesive Compositions

| Formulation | Bester 648 (g) | Desmodur 2460 (g) | MPD (g) | NPG (g) | DEG (g) | DPG (g) | PPG2000 (g) |
|---|---|---|---|---|---|---|---|
| IE1: Isocyanate Component | 82 | 170 | 5 | | | | |
| CE1: Isocyanate Component | 82 | 170 | | 5 | | | |
| CE2: Isocyanate Component | 82 | 170 | | | 5 | | |
| CE3: Isocyanate Component | 82 | 170 | | | | 5 | |
| IE1: Polyol Component | 45 | | 15 | | | | 40 |
| CE1: Polyol Component | 45 | | | 15 | | | 40 |
| CE2: Polyol Component | 45 | | | | 15 | | 40 |
| CE3: Polyol Component | 45 | | | | | 15 | 40 |

Testing Procedures

Coating and lamination using the Example compositions are conducted in a Nordmeccanica Labo-Combi 400 laminating machine. The nip temperature is kept at 40° C. with 100 m/min speed during the entire lamination process. Coating weight is 1.8 to 2.0 g/m2. After coating, the laminated film is cured at room temperature (23 to 25° C.) or at elevated temperature in an oven before testing.

After curing, the laminated films are cut into 15 mm width strips for T-peel bonding strength testing (i.e., hand assisted T-peel) in an Instron 5943 machine with 250 mm/min crosshead speed. Three strips are tested and the average value calculated. During testing, the tail of the strip is pulled slightly by finger to make sure the tail remains 90° degree to the peeling direction.

In order to test heat seal strength, the laminated films are heat-sealed in a HSG-C Heat-Sealing Machine available from Brugger Company under 140° C. seal temperature and 300N pressure for 1 second. The films are then cooled down and cut into 15 mm width strips for heat seal strength test under 250 mm/min crosshead speed using a 5940 Series Single Column Table Top System available from Instron Corporation. Three strips for each sample are tested and the average value calculated. Results are in the unit of N/15 mm.

In order to test coefficient of friction ("COF"), the laminated films are put into a 50° C. oven for 48 hours. The films are then taken out, cooled down, and recovered under room temperature for 3 days. After cooling, the films are cut into 64 mm×64 mm and 10 cm×10 cm pieces. The 64 mm×64 mm pieces are stuck onto the slider and the 10 cm×10 cm pieces are stuck onto the platform of a GM-1 Coefficient of Friction Tester available from Guangzhou Biaoji Packaging Equipment Co., Ltd. The polyethylene sides of both pieces are facing each other for COF testing. The GM-1 Tester is calibrated before the test. Three pairs of pieces, a pair being one 64 mm×64 mm piece and one 10 cm×10 cm piece, for each sample are tested and the average value calculated. Results are reported as pure number.

In order to test chemical resistance, the laminated films are cut into 8"×12" pieces and then folded over to heat seal the bottom and side of the larger rectangle by a heat seal machine under 140° C. and 300N/15 mm for 1 second. In this way, the films form a pouch. The pouch is then filled approximately two-thirds full with apple juice and sealed in a manner that minimizes air entrapment.

Any noticeable preexisting flaws in the heat seal area or laminating area are marked with an indelible marker. The pouches are then placed in boiling water and left for 30 minutes. The pouches are immersed in the water throughout the boiling in bag ("BIB") process. After 30 minutes, the extent of tunneling, delamination, and/or leakage is recorded for each sample pouch. An acceptable sample shows no evidence of tunneling, delamination, or leakage beyond any pre-existing heat seal or laminating flaws. Such as a sample is identified as "good" or "acceptable." An example showing evidence of tunneling, delamination, or leakage is identified as such (e.g., moderate tunneling, high tunneling, etc.). Next, the pouch is opened and the contents emptied. The material is then cut into 15 mm width strips to test the T-peel bonding strength and heat seal strength in the Instron 5943 machine.

TABLE 3

Performance Results

|  | Target |  | IE1 | CE1 | CE2 | CE3 |
|---|---|---|---|---|---|---|
| NCO/OH |  |  | 100/65 | 100/65 | 100/65 | 100/65 |
| Viscosity |  |  | 3050 | 3616 | 4015 | 4636 |
| COF (50° C. cure/3 day recovery) | <0.2 | Dynamic | 0.174 | 0.223 | 0.228 | 0.252 |
|  |  | Static | 0.174 | 0.235 | 0.256 | 0.276 |
| Bond Strength | >2N/15 mm | Before BIB | 2.5 | 2.4 | 2.42 | 2.46 |
|  |  | After BIB | 2.8 | 2.6 | 2.23 | 2.6 |
| Heat Seal Strength | >40N/ 15 mm | Before BIB | 44 | 49 | 45 | 49 |
|  |  | After BIB | 49 | 28 | 14 | 18 |
| Appearance | Good | After BIB | Good | High tunneling | High tunneling | High tunneling |

As illustrated in Table 3, IE1, which included 3-methyl-1,5-pentanediol in both the isocyanate and polyol components, outperformed CE1-CE3 in COF, bond strength, heat seal after BIB, and appearance. The results unanimously show that inclusion of 3-methyl-1,5-pentanediol is surprisingly beneficial in two-component solventless adhesive compositions for the purposes of bond strength, heat seal strength, coefficient of friction, and appearance.

Examples IE2 and IE3 are prepared according to the formulations set forth in Table 4. These Examples include different amounts of MPD and 2-methyl-1,3-propanediol. Still further, the NCO/OH mix ratio is adjusted to keep similar NCO index.

TABLE 4

Two-Component Solventless Adhesive Compositions

| Formulation | Bester 648 (g) | Desmodur 2460 (g) | MPD (g) | MPDiol (g) | PPG2000 (g) |
|---|---|---|---|---|---|
| IE2: Isocyanate Component | 82 | 170 | 5 |  |  |
| IE3: Isocyanate Component | 82 | 170 |  | 5 |  |
| IE2-1: Polyol Component | 50 |  | 5 |  | 45 |
| IE2-2: Polyol Component | 45 |  | 15 |  | 40 |
| IE2-3: Polyol Component | 40 |  | 25 |  | 35 |
| IE3-1: Polyol Component | 50 |  |  | 5 | 45 |
| IE3-2: Polyol Component | 45 |  |  | 15 | 40 |
| IE3-3: Polyol Component | 40 |  |  | 25 | 35 |

Examples IE2 and IE3 are tested as discussed above. The performance results for Examples IE2 and IE3 are set forth in Table 5.

TABLE 5

Performance Results

|  |  | IE2-1 | IE2-2 | IE2-3 | IE3-1 | IE3-2 | IE3-3 |
|---|---|---|---|---|---|---|---|
| NCO/OH |  | 100/90 | 100/65 | 100/45 | 100/90 | 100/65 | 100/45 |
| COF (50° C. cure/3 day recovery) | Dynamic | 0.25 | 0.194 | 0.14 | 0.21 | 0.192 | 0.16 |
| Bond Strength | Before BIB | 1.4 | 2.5 | 2.7 | 1.6 | 2.5 | 2.8 |
|  | After BIB | 2.2 | 2.8 | 2.9 | 1.9 | 2.5 | 2.8 |
| Heat Seal Strength | After BIB | 50 | 46 | 41 | 48 | 42 | 44 |
| Appearance | After BIB | Good | Good | Good | Good | Good | Good |

As illustrated in Table 5, all the IE samples, which included branched alkane diol in both the isocyanate and polyol components, showed outstanding chemical resistance, heat seal strength, bond strength, and COF performance.

The invention claimed is:

1. A two-component solventless adhesive composition, comprising:
    an isocyanate component comprising at least one isocyanate prepolymer that is the reaction product of reactants comprising at least one isocyanate, at least one polyol, and a branched alkane diol, wherein the branched alkane diol of the isocyanate component is selected from 3-methyl-1, 5-pentanediol, 2-methyl-1,3-propanediol, and combinations thereof; and
    a polyol component consisting of at least one polyol and a branched alkane diol, wherein the branched alkane diol of the polyol component is 3-methyl-1,5-pentanediol, wherein the amount of the at least one polyol in the polyol component is not to exceed, by weight based on the weight of the polyol component, 90 wt. %.

2. The composition of claim 1, wherein the at least one isocyanate is selected from the group consisting of 4,4-methylene diphenyl diisocyanate, 2,4-toluene diisocyanate, 2, 6-toluene diisocyanate, 2, 4-methylene diphenyl diisocyanate, 2,2-methylene diphenyl diisocyanate, hexamethylene diisocyanate, isophorone diisocyanate, xylene diisocyanate, and combinations thereof.

3. The composition of claim 1, wherein the at least one polyol of the isocyanate component and the at least one polyol of the polyol component are each selected from the group consisting of a polyester polyol, a polyether polyol, and combinations thereof.

4. The composition according to claim 1, wherein the composition comprises 3 to 15 percent by weight total of branched alkane diol based on the total weight of the composition.

* * * * *